United States Patent Office 3,577,377
Patented May 4, 1971

3,577,377
POLYESTER TIRE CORD ADHESIVE DIPS
Wun T. Tai, Monroevillle, Pa., assignor to
Koppers Company, Inc.
No Drawing. Filed Nov. 29, 1968, Ser. No. 780,208
Int. Cl. C08d 7/00; C09d 5/02
U.S. Cl. 260—29.7                                    1 Claim

ABSTRACT OF THE DISCLOSURE

Adhesive dips suitable for the bonding of polyester fibers to rubber in the manufacture of reinforced rubber articles are prepared from tris(monohydroxybenzyl)phenol and an aqueous rubber latex.

BACKGROUND OF THE INVENTION

In U.S. 3,285,938, relating to the tetraglycidyl ethers of tris(hydroxybenzyl)phenol, there is described, as an intermediate for such ethers, the resin former tris(hydroxybenzyl)phenol. Although specific properties of the tris(hydrorybenzyl)phenol are not described, this known compound is said to be a resinous product at room temperature. The compound is generally prepared by reacting one mole of trimethylolphenol with three moles of phenol.

It is known that polyester fiber has many desirable characteristics as a reinforcement for rubber articles. Polyester fibers exhibit high tensile strength, absorb less moisture than nylon or rayon, and stretch less than other fibers, resulting in greater dimensional stability of articles reinforced therewith. Polyester fibers also resist heat much better than do nylon or rayon fibers. It has been difficult to bond polyester cord to rubber, however, because of the difficulty in properly wetting and penetrating the fiber. Adhesives for bonding of polyester cord to rubber must overcome such problems as insufficient bond strength, poor heat resistance, poor flex life, and difficulty of application.

It has now been discovered that adhesive dips for the bonding of polyester fiber to rubber stock can be prepared from aqueous rubber latices and 10 to 50 parts per 100 parts of rubber of tris(hydroxybenzylphenol. The effectiveness of these polyester cord adhesive dips is surprising in view of the fact that dips containing tris(monohydroxybenzyl)phenol are unsuitable for the bonding of nylon or rayon cords.

SUMMARY OF THE INVENTION

An adhesive dip for bonding polyester fibers to rubber is prepared by mixing an aqueous rubber latex, tris(monohydroxybenzyl)phenol, the tris(monohydroxybenzyl)phenol being present in an amount of 10 to 50 parts per 100 parts of rubber in the latex, sufficient alkali to provide a pH of between 10.0 and 13.5 and enough water to give a solids content in the dip of about 8 to 25 percent by weight.

DETAILED DESCRIPTION

The novel adhesive dips of the present invention contain tris(monohydroxybenzyl)phenol. Tris (monohydroxybenzyl)phenol and the method of its preparation are described in U.S. 3,285,938. In U.S. 3,285,938, the compound is used as an intermediate in the preparation of glycidyl ethers. Tris(monohydroxybenzyl)phenol can be prepared by the method described in the above patent or by other suitable methods from phenol and trimethylolphenol or tris(methoxymethyl)phenol by acid catalyzed condensation.

The adhesive dip is prepared by forming an aqueous mixture of a suitable rubber latex and tris(monohydroxybenzyl)phenol. The tris(monohydroxybenzyl)phenol is preferably diluted with sufficient water to reduce the concentration and the latex is then added to the aqueous solution.

The rubber latex useful in the adhesive dips of the present invention are the conventional rubber latices used in the formation of rubber adhesive dips. Such latices include vinylpyridine-styrene-butadiene terpolymer latices as well as hot polymerized (2000 series) styrene-butadiene latices, cold polymerized (2100 series) styrene, butadiene latices, natural latex, reclaimed rubber dispersions, butyl rubber dispersions or ethylene-propylene-butadiene terpolymer rubber dispersions.

The resin to rubber ratio of the adhesive dips should range between 10 to 50 parts resin former per 100 parts of rubber solids, that is, the amount of rubber, on a dry basis, in the latex. Less than about 10 parts will provide insufficient adhesion, whereas greater than about 50 parts resin per 100 parts rubber is economically undesirable.

The resin adhesive dip, in aqueous solution, normally contains about 8 to 25 percent solids. Preferably, about 10 percent total solids is desired in the aqueous mixture, with additional water being added, if necessary, to achieve the desired solids content. The term "solids" as used in determining the solids content of the dip is used to define the amount of rubber and the amount of resin added, i.e., the non-volatile portion of the dip.

The aqueous dips of the present invention should be adjusted to a pH of between about 10.0 and 13.5. Such pH adjustment may be made by the addition of an aqueous caustic solution such as sodium hydroxide of the addition of ammonium hydroxide to the adhesive dip to arrive at the desired pH. However, if the composition is added thereto a vinylpyridine latex (pH 10.2), the dip may not require further pH adjustment. Too high pH values should be avoided because of the danger of attack on the fiber material used in the cord.

The dipped cords, coated with the adhesive dip of the present invention may be bonded to various kinds of rubber substrates including natural rubber, styrene-butadiene rubber, polybutadiene, butyl-ethylene-propylene terpolymers, and the new synthetic-natural polyisoprene rubbers.

In dipping of polyester tire cord, the cord is treated under tension with the adhesive dip in a latex dipping machine. The dipped cord is then dried for about 60 to 240 seconds at 400 to 500° F., and applied to the rubber stock and cured.

In applying the dip to polyester tire cords, a conventional dipping machine is employed whereby a cord is continuously drawn through the dip batch by a system of pulleys, the minimum of applied tension during the passage through the dip in order to gain maximum wet pickup. The excess dip is removed by blowing the cords with air jets, vibration or by squeezing between rubber rolls then conducted through a hot air tunnel to dry the cord and raise it to a temperature about 400° F. and up to about 500° F. The preferred temperature has been found to be about 450° F. and an upper limit for the temperature of curing is reached when degradation of the polyester tire cord results from such increased temperature.

During the hot drying phase of the process, the cord is stretched about 3 to 4 percent and exposed for a sufficient time to cure the dip on the cord. The time necessary for curing period must result in additional curing time for the preparation of the dip to the polyester cord. Exposure time of about 120 seconds (450° F.) has been found to be suitable.

The successful bonding of rubber to tire cord is measured by the static adhesion test. The H-test has been employed by the rubber industry to determine the static adhesion of textile cord to rubber. This test is specified as ASTM D-2138-67 and was employed in testing the adhesive in the present invention. The H-test is the method for the measurement of the force necessary to pull a single cord axially from a small block of rubber in which it is embedded. Ideally, the shear strength of the adhesive film rubber or the adhesive film cord inner base would be measured. In performing the tests, the two small blocks of rubber are bonded to an inter-connecting cord to form a specimen which resembles the letter H, thus characterizing the test. The rupture is effected by pulling the specimens apart by means of two-hook clamps, failure occurring when the bond in either of the blocks is ruptured. The data, of course, evaluated as to the size of the specimen and temperature at which the test is performed.

The invention is further illustrated by the following examples wherein parts are parts by weight unless otherwise indicated.

Example I

Tris(monohydroxybenzyl)phenol was prepared following the procedure described in Example I, part (a), of U.S. 3,285,938.

An adhesive dip for polyester tire cord was made by mixing 4.6 parts of the above product, 67.37 parts water, and 28.03 parts of a commercial terpolymer latex (vinylpyridine-styrene-butadiene, Gen-Tac latex, 41 percent solids). The resulting dip had a total solids content of 15.3 percent, and a resin to rubber ratio of 1:2.5. The pH of the dip had to be adjusted to about 10.6 to obtain a stable dispersion of all the ingredients. This dip was designated Dip A. Three additional dips (B-D) were prepared as above, but the pH values modified with 10 percent aqueous sodium hydroxide.

Five dips were prepared (E-I) using the composition of Dip A, but substituting a conventional resorcinol-formaldehyde resin for the tris(hydroxybenzyl)phenol. The resorcinol-formaldehyde resin used was prepared according to the procedure of U.S. 2,385,372. The dips were adjusted to various pH values by 10 percent aqueous sodium hydroxide. The dips (A-I) were applied to polyester tire cord, Dacron T-68 (1000 denier, 3-ply construction, 10.3/10.3 twist), the dipped cord cured two minutes at 450° F. and bonded to standard laboratory stock natural rubber. Bonded stock thus prepared was evaluated for H-test adhesion according to ASTM Method D-2138-67 (average of 10 specimens). The H-test results are listed in Table I.

TABLE I

| Adhesive dip | | Dip pH | ¼″ H-test pounds at 100 ± 1° C. |
|---|---|---|---|
| Tris(monohydroxybenzyl)phenol | A | 10.60 | 13.2 |
| | B | 10.82 | 11.6 |
| | C | 11.12 | 8.6 |
| | D | 11.48 | 8.5 |
| Conventional resorcinol formaldehyde resin | E | 8.12 | 7.3 |
| | F | 8.48 | 6.7 |
| | G | 8.69 | 6.7 |
| | H | 8.81 | 6.6 |
| | I | 9.08 | 6.0 |

Example II

An adhesive dip for polyester cord was formed by mixing 4.6 parts of tris(monohydroxybenzyl)phenol, prepared according to Example I, and 67.37 parts water. There was then added 1.15 parts formaldehyde (37 percent aqueous solution). Following a two-hour aging period at room temperature, 28.03 parts commercial latex (vinylpyridine-styrene-butadiene, Gen-Tac latex, 41 percent solids) was added. The dip was designated Dip A. A second dip was prepared (Dip B) as above, substituting a conventional resorcinol-formaldehyde resin prepared according to U.S. 2,385,372 for the tris(monohydroxybenzyl)phenol of Dip A. The dips were used to bond polyester tire cord to natural rubber stock following the procedure of Example I. The H-test results are listed in Table II:

TABLE II

| | Dip pH | Percent dip pickup | Cured film state | ¼″ H-test pounds at 100±1° C. |
|---|---|---|---|---|
| Adhesive dip: | | | | |
| A | 10.92 | 6.39 | Very tacky | 15.0 |
| B | 8.51 | 4.33 | Some tack | 11.9 |

Thus, with added formaldehyde, the tris(monohydroxybenzyl)phenol also gives greater adhesion than a resorcinol-formaldehyde resin; increased adhesion on the order of 25 percent increase in H-test values.

What is claimed is:

1. A polyester cord adhesive dip for the bonding of polyester fiber to rubber comprising an aqueous mixture of rubber latex selected from the group consisting of vinylpyridine-styrene-butadiene terpolymer, hot polymerized styrene-butadiene, cold polymerized styrene-butadiene, natural rubber, reclaimed rubber dispersions, butyl rubber dispersions, and ethylene-propylene-butadiene terpolymer, tris(monohydroxybenzyl)phenol, said tris(monohydroxybenzyl)phenol being present in an amount of 10 to 50 parts by weight per 100 parts of rubber in said latex, sufficient aqueous caustic solution to provide a pH of about 10 to 13.5, and sufficient water to adjust the solids content of said mixture to about 8 to 25 percent by weight.

References Cited

UNITED STATES PATENTS

| 2,410,792 | 11/1946 | Ten Broeck | 260—29.7(E) |
| 2,889,374 | 6/1959 | Meyers | 260—47X |
| 3,338,769 | 8/1967 | Kühlkamp et al. | 260—29.3X |
| 3,454,508 | 7/1969 | Herrick et al. | 260—29.3X |

JULIUS FROME, Primary Examiner

D. A. JACKSON, Assistant Examiner

U.S. Cl. X.R.

117—138.8; 260—29.3